B. A. CASMIRE.
ICE CREAM FREEZER.
APPLICATION FILED FEB. 7, 1912.

1,053,708.

Patented Feb. 18, 1913.

Witnesses
Frank A. Fahle
May Layden

Inventor
Bert A. Casmire,
By Arthur M. Hood
Attorney

UNITED STATES PATENT OFFICE.

BERT A. CASMIRE, OF INDIANAPOLIS, INDIANA.

ICE-CREAM FREEZER.

1,053,708.        Specification of Letters Patent.        Patented Feb. 18, 1913.

Application filed February 7, 1912. Serial No. 676,001.

*To all whom it may concern:*

Be it known that I, BERT A. CASMIRE, a citizen of the United States, residing at Indianapolis, in the county of Marion and State of Indiana, have invented a new and useful Ice-Cream Freezer, of which the following is a specification.

The cream or sherbet made in external ice cream freezers is of extremely delicate texture, and will melt very quickly if it is not kept cold. Moreover, such cream or sherbet is quite compact, so that it is often desirable to aerate it not merely to increase its bulk but to make it suit some tastes. The making of the cream or sherbet is facilitated by using cold flavoring material, as the frozen cream or sherbet is often desired in some suitable form.

It is the object of my invention to take care of these features, and at the same time to provide certain conveniences necessary for many commercial freezers.

The various novel features of my invention will appear from the description and drawings, and will be particularly pointed out in the claims.

Figure 1:
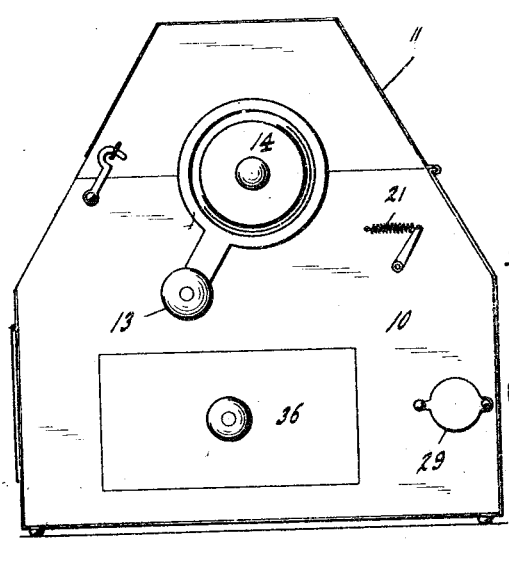
Figure 2:
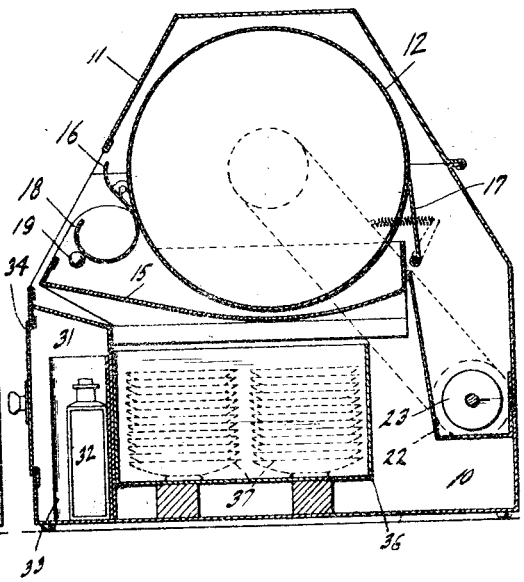
Figure 3:
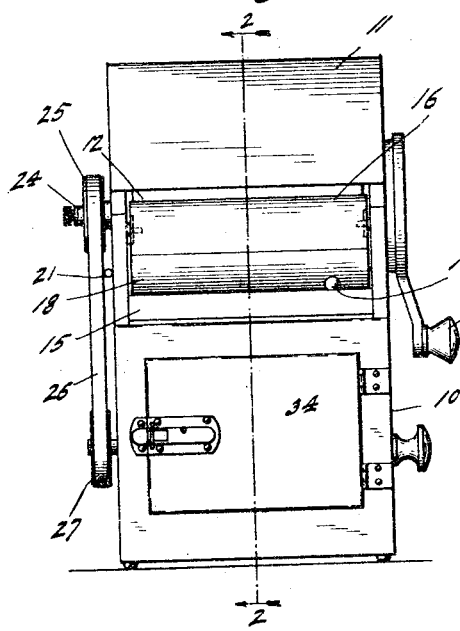
Figure 4:
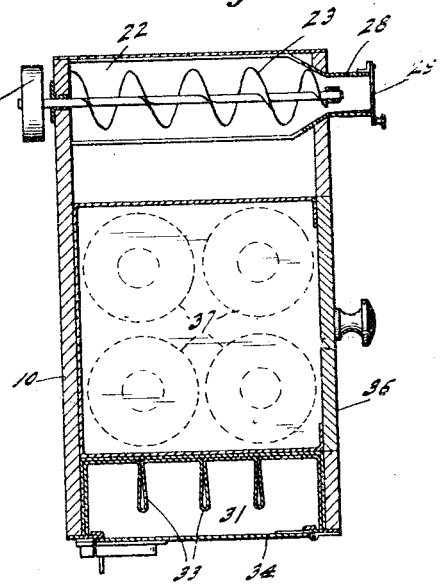

Figure 1 is a side elevation of a freezer embodying my invention; Fig. 2 a longitudinal section taken on the line 2—2 of Fig. 3; Fig. 3 a front elevation; and Fig. 4 a horizontal section.

The casing 10 is preferably rectangular in horizontal section, its ends being parallel toward the bottom and sloping toward each other at the top. The casing has a removable cover 11, the sides of which extend down part way along such sloping ends. A hollow metal cylinder 12, removably mounted in the casing 10 with its axis extending crosswise thereof in the plane of the bottom of the cover 11, is rotatable by a handle 13 when in place in the casing. One end of the cylinder is provided with a removable cap 14, to allow the insertion or removal of salt and ice or other freezing mixture. Below the cylinder 12 is a curved tray 15, removable for cleansing. The lowest point in this tray is directly beneath the axis of the cylinder 12 and but slightly separated therefrom, so that in the operation of the device all of the material to be frozen will be taken up by the cylinder. On opposite sides of the cylinders are two scrapers 16 and 17, for removing the frozen cream or sherbet from the surface of the cylinder when the latter rotates in opposite directions respectively. The scraper 16, which operates only when the cylinder is turned in a counter-clockwise direction, is mounted on the upper edge of a removable pivoted cup 18, which normally lies against the surface of the cylinder 12 with the scraper out of engagement with said cylinder but may be moved by a handle 19, to bring the scraper 16 into engagement with the cylinder and scrape the frozen cream or sherbet from the cylinder into the cup. This cup is open at one end so that the frozen cream or sherbet may easily be removed therefrom. The scraper 17 is spring-pressed, by a spring 21, against the surface of the cylinder 12 and operates to remove the cream or sherbet therefrom when the cylinder is turned in a clockwise direction. The cream or sherbet, when scraped from the cylinder 12 by the scraper 17 falls into a chamber 22 at one end of the casing 10 near the bottom. This chamber extends transversely of the casing, and in it is a screw 23, the axis of which extends longitudinally of said chamber. The screw 23 is preferably driven from the cylinder 12, when desired, as by having on its shaft 24 a pulley 27 connected by a belt 26 to the releasable pulley 25 on the shaft of the cylinder 12. At the opposite end of the chamber 22 from that at which the pulley 27 is located, such chamber is contracted to form a discharge opening 28 of suitable shape, such opening having a door or gate 29. The screw is spaced from the walls of the chamber 22 throughout its length except at the contracted discharge or door end thereof, at which end the screw fits closely to the walls of the chamber. The screw 23 forces the frozen material in it along the chamber 22 toward such opening 28, and, if the gate 29 is opened, out through such opening in the shape of the latter. The screw 23 not only forces the frozen material along the chamber 22, but aerates it to increase its bulk and make it more in accordance with the taste of many people.

At the opposite end of the casing 10 from the chamber 22 is a receptacle or cupboard 31 for receiving and cooling a number of bottles 32 containing various flavoring extracts. The cupboard may be divided by partitions 33 to provide compartments for the several bottles, and is closed by a door 34 at the end of the casing 10. Between the receptacle 31 and the chamber 22 in the bottom of the casing 10 is a sliding drawer 36, for holding and cooling a number of plates or dishes 37 for the cream or sherbet.

The cylinder 12 being filled with salt and ice or other suitable freezing mixture, a sufficient quantity of sweetened cream or water is placed in the tray 15, the amount depending upon the amount of cream or sherbet desired, and such cream or water is flavored with the cooled extract obtained from one of the bottles 32. Then the cylinder 12 is turned by the handle 13 in one direction or the other, picking up and freezing a layer of ice cream or sherbet on its surface as the latter passes through the liquid in the tray 15. If the rotation of the cylinder 12 is counter-clockwise the scraper 16 may be brought into play to scrape the frozen cream or sherbet from the cylinder into the cup 18, from which it can be removed at the open end into one of the cooled plates 37 taken from the drawer 36. This cream, which is not aerated, is kept in a frozen condition in the cup 18 as long as desired by the contact of such cup with the surface of the cylinder 12. If aerated cream or sherbet is desired, the cylinder is turned in a clockwise direction, and as soon as formed is scraped from the cylinder by the scraper 17 into the chamber 22. Here it is aerated by the screw 23, and discharged as desired through the opening 28 into one of the cooled plates 37. The freezing mixture in the cylinder 12 serves not only to freeze the cream or sherbet, but also cools the plates 37, keeps the extracts in the bottles 32 cold, and keeps the frozen cream or sherbet in a frozen condition as long as it remains in either the cup 18 or the chamber 22.

I claim as my invention:

1. An ice-cream freezer, comprising a rotatable hollow cylinder for containing a freezing mixture, a tray into which said cylinder dips in its rotation, and two oppositely arranged scrapers for scraping the frozen material from the surface of the cylinder, according to the direction of rotation of the cylinder.

2. An ice-cream freezer, comprising a rotatable hollow cylinder for containing a freezing mixture, a tray into which said cylinder dips in its rotation, and two oppositely arranged scrapers for scraping the frozen material from the surface of the cylinder, according to the direction of rotation of the cylinder, one of said scrapers being spring-pressed toward the cylinder and normally in contact therewith and the other being normally out of contact with the cylinder but manually movable into engagement therewith.

3. An ice-cream freezer, comprising a rotatable hollow cylinder for containing a freezing mixture, a tray into which said cylinder dips in its rotation, two oppositely arranged scrapers for scraping the frozen material from the surface of the cylinder, according to the direction of rotation of the cylinder, two chambers to which said scrapers discharge respectively, and means in one of said chambers for aerating the material therein.

4. An ice-cream freezer, comprising a rotatable hollow cylinder for containing a freezing mixture, a tray into which said cylinder dips in its rotation, two oppositely arranged scrapers for scraping the frozen material from the surface of the cylinder, according to the direction of rotation of the cylinder, two chambers to which said scrapers discharge respectively, means in one of said chambers for aerating the material therein, and driving connections between said aerating means and the cylinder.

5. An ice-cream freezer, comprising a hollow cylinder for containing a freezing mixture, a tray into which said cylinder dips in its rotation, a chamber, a scraper for scraping the frozen material from the surface of the cylinder into said chamber, a screw in said chamber, and a door for that end of the chamber toward which the screw forces the material in the chamber, said chamber and screw substantially fitting at the door end thereof only and being spaced apart elsewhere throughout their length.

In witness whereof, I, have hereunto set my hand and seal at Indianapolis, Indiana, this 3rd day of February, A. D. one thousand nine hundred and twelve.

BERT A. CASMIRE. [L. S.]

Witnesses:
FRANK A. FAHLE,
G. B. SCHLEY.